United States Patent
Momoo et al.

(10) Patent No.: US 10,878,847 B2
(45) Date of Patent: Dec. 29, 2020

(54) OPTICAL INFORMATION PROCESSING DEVICE

(71) Applicant: Panasonic Intellectual Property Management Co., Ltd., Osaka (JP)

(72) Inventors: Kazuo Momoo, Osaka (JP); Yuichi Takahashi, Nara (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 49 days.

(21) Appl. No.: 16/512,875

(22) Filed: Jul. 16, 2019

(65) Prior Publication Data
US 2019/0341072 A1 Nov. 7, 2019

Related U.S. Application Data

(63) Continuation of application No. PCT/JP2018/000611, filed on Jan. 12, 2018.

(30) Foreign Application Priority Data

Feb. 3, 2017 (JP) .................................. 2017-018156

(51) Int. Cl.
*G11B 7/09* (2006.01)
*G11B 7/085* (2006.01)
(Continued)

(52) U.S. Cl.
CPC ............ *G11B 7/0917* (2013.01); *G11B 7/085* (2013.01); *G11B 7/095* (2013.01); *G11B 7/1353* (2013.01); *G11B 7/1378* (2013.01); *G11B 7/24* (2013.01)

(58) Field of Classification Search
CPC ....... G11B 7/0917; G11B 7/085; G11B 7/095; G11B 7/1353; G11B 7/1378; G11B 7/24;
(Continued)

(56) References Cited

U.S. PATENT DOCUMENTS 5,231,280 A * 7/1993 Imakawa .................. G02B 7/34
250/201.5
7,016,269 B2 * 3/2006 Ogasawara ......... G11B 7/08511
369/44.25

FOREIGN PATENT DOCUMENTS

JP    2-301020       12/1990
JP    2001-195751    7/2001
(Continued)

OTHER PUBLICATIONS

International Search Report dated Apr. 3, 2018 in International (PCT) Application No. PCT/JP2018/000611.

*Primary Examiner* — Seung C Sohn
(74) *Attorney, Agent, or Firm* — Wenderoth, Lind & Ponack, L.L.P.

(57) ABSTRACT

An optical information processing device writes and reads information on an information recording medium having recording layers. The optical information processing device includes: first and second light sources; a light condensing element that condenses light from the first and second light sources on the medium; a first photodetector that receives light reflected by the medium after being emitted from the first light source and generates a first focusing error signal; a second photodetector that receives light reflected by the medium after being emitted from the second light source and generates a second focusing error signal; and a focusing control circuit that controls the light condensing element by using the first focusing error signal in such a manner that the light from the second light source is condensed on each of the recording layers. The second focusing error signal is used to add a correction to the focusing control circuit.

14 Claims, 8 Drawing Sheets

(51) Int. Cl.
 *G11B 7/095* (2006.01)
 *G11B 7/1353* (2012.01)
 *G11B 7/1378* (2012.01)
 *G11B 7/24* (2013.01)

(58) Field of Classification Search
 CPC ... G11B 7/1369; G11B 7/1275; G11B 7/0941; G11B 7/2405; G11B 7/0908
 See application file for complete search history.

(56) References Cited

FOREIGN PATENT DOCUMENTS

| JP | 2001-307344 | 11/2001 |
| JP | 2012-9091 | 1/2012 |

\* cited by examiner

OPTICAL INFORMATION PROCESSING DEVICE

BACKGROUND

1. Technical Field

The present disclosure relates to a optical information processing device that optically writes and reads information on an information recording medium.

2. Description of the Related Art

With respect to an information recording medium that includes: a guide layer having a guide track; and a plurality of recording layers, PTL 1 and PTL 2 achieve writing and reading of information on the recording layer by condensing light from each of two light sources on each of the guide layer and one of the recording layers.

Here, PTL 1 is Unexamined Japanese Patent Publication No. H02-301020, and PTL 2 is Unexamined Japanese Patent Publication No. 2001-307344.

SUMMARY

An optical disc is an example of an information recording medium having: a guide layer having a guide track; and a plurality of recording layers. Regarding such an optical disc, it is not necessary to provide, on the recording layer, a guide groove for tracking or pre-pits for address information or the like; therefore, it is easy to stack recording layers, so that there is an advantage that the number of stacked layers can be increased and that the optical disc can be manufactured at low cost.

As a configuration of an optical information processing device that writes and reads on such an optical disc, there is proposed a configuration that uses a first light source and a second light source as described in PTL 1 and PTL 2. In each of PTL 1 and PTL 2, light from the first light source is condensed on the guide layer, and light from the second light source is condensed on the recording layer. A condensed spot of the first light source and a condensed spot of the second light source are set to be apart from each other by a distance corresponding to an interval between the guide layer and the recording layer.

The light from the first light source is reflected by the guide layer and is received by a first photodetector. By using a first focusing error signal obtained from the first photodetector, focusing control is performed by driving an objective lens as an example of a light condensing element in a focusing direction so that the light from the first light source is condensed on the guide layer. At this time, the light spot of the second light source, which is a predetermined interval apart from the light spot of the first light source, is condensed on the recording layer.

However, each recording layer stacked on the guide layer has a thickness error and a variation in thickness. Therefore, an actual optical disc has a variation in the interval between the guide layer and each recording layer. Each variation is referred to as an interval error. Further, in general, the interval error fluctuates during one turn of the optical disc and cause a displacement, in an optical axis direction, of a position of the condensed spot formed on the recording layer by the light from the second light source. The displacement of the position of the condensed spot is referred to as a light condensation error.

PTL 1 describes that a light source position is controlled as a method for correcting the light condensation error; however, PTL 1 neither disclose a means for detecting the light condensation error caused by the interval error nor discloses a specific configuration to control the light source position. In addition, to correct the interval error that fluctuates during one turn of the optical disc, there is an issue that there is a need for a complex mechanism for moving the light source position at a high speed in a wide range.

In PTL 2, the light from the second light source reflected by the recording layer is received by a second photodetector, and a signal of wobble marks obtained from the second photodetector is used to obtain a signal of the light condensation error. The signal of the wobble marks is previously recorded on the recording layer. Then, control is performed in such a manner that by using the signal of the light condensation error, a collimator lens on an optical path between the second light source and the optical disc is driven by an actuator so as to accurately condense the light from the second light source on the recording layer. However, there is an issue that there is a need for a wideband actuator to drive the collimator lens and that the optical information processing device therefore needs to be complex and large.

The present disclosure provides an optical information processing device in which, when information is optically writes and reads on an information recording medium having: a guide layer having a guide track; and a plurality of recording layers, it is possible to perform control for focusing accurately on the recording layer with a simple configuration.

An optical information processing device in the present disclosure writes and reads information on an information recording medium having: a guide layer having a guide track; and a plurality of recording layers. The optical information processing device is configured with: a first light source; a second light source; a light condensing element that condenses light from the first light source and light from the second light source on the information recording medium; a first photodetector that receives light reflected by the information recording medium after being emitted from the first light source and generates a first focusing error signal; a second photodetector that receives light reflected by the information recording medium after being emitted from the second light source and generates a second focusing error signal; and a focusing control circuit that controls the light condensing element by using the first focusing error signal in such a manner that the light from the second light source is condensed on each of the plurality of recording layers in the information recording medium. The optical information processing device adds a correction to the focusing control circuit by using the second focusing error signal.

While an optical information processing device in the present disclosure has a simple configuration, the optical information processing device can more stably perform control for focusing on a recording layer when writing and reading information on an information recording medium.

DETAILED DESCRIPTION

Figure 1:
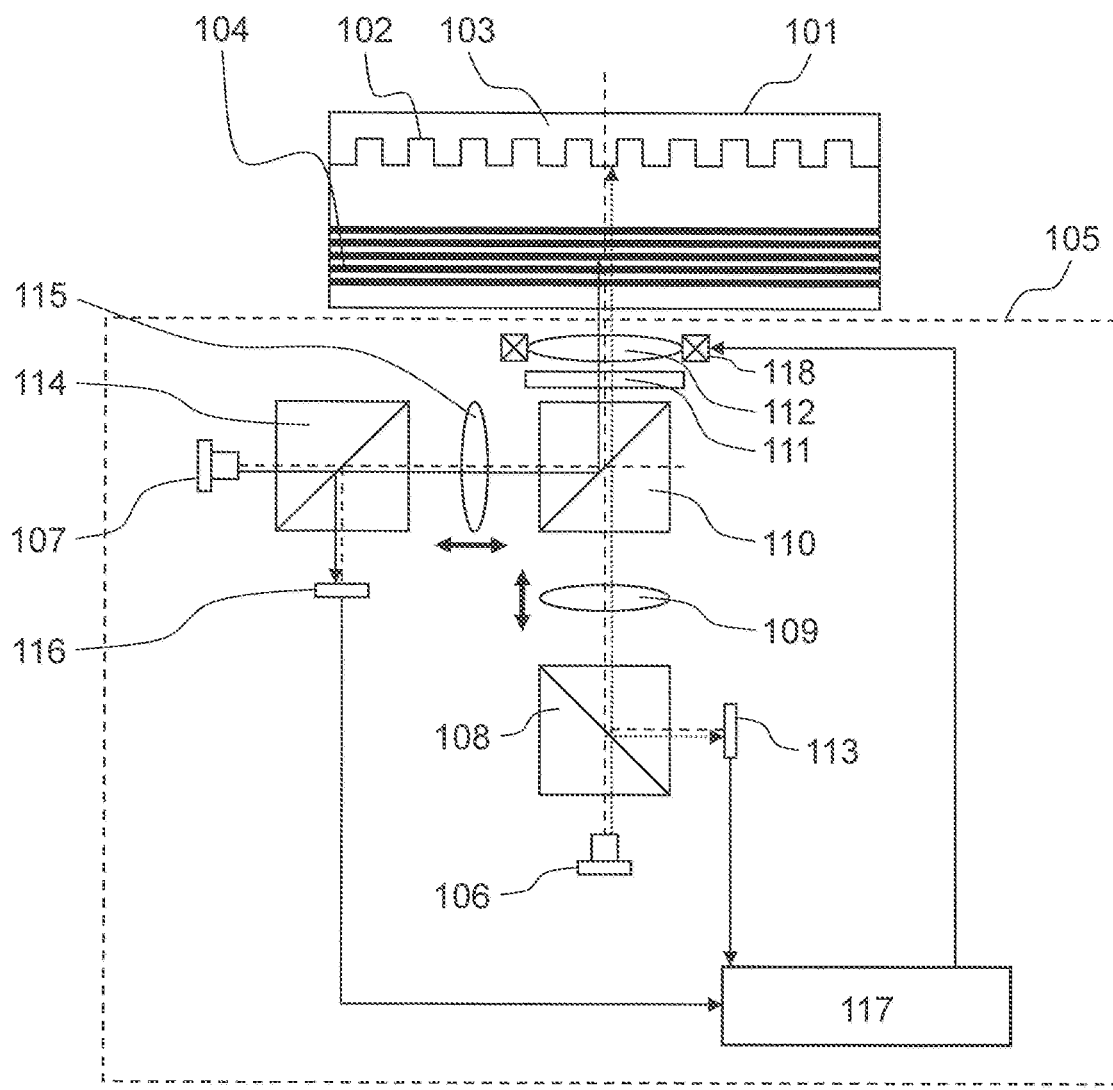
FIG. 1 is a block diagram showing a configuration of an optical information processing device in a first exemplary embodiment.

Hereinafter, exemplary embodiments will be described in detail appropriately with reference to the drawings. However, an unnecessarily detailed description will be omitted in some cases. For example, a detailed description of a well-known matter and a duplicated description of substantially the same configuration will be omitted in some cases. This is to avoid the following description from being unnecessarily redundant and thus to help those skilled in the art to easily understand the description.

Note that the accompanying drawings and the following description are provided to help those skilled in the art to sufficiently understand the present disclosure and are not intended to limit the subject matters described in the claims.

First Exemplary Embodiment

Hereinafter, a first exemplary embodiment will be described with reference to FIG. 1 to FIG. 5.

[1-1. Object]

In a method, a first light source and a second light source are used, as components, in an optical information processing device, and the optical information processing device writes and reads on an optical disc having: a guide layer having a guide track; and a plurality of recording layers, where light from the first light source is condensed on the guide layer and light from the second light source is condensed on the recording layers. A condensed spot of the first light source and a condensed spot of the second light source are set to be apart from each other by a distance corresponding to an interval between the guide layer and one of the recording layers, and by performing focusing control in such a manner that the light from the first light source is condensed on the guide layer, a light spot of the second light source is condensed on the recording layer. However, this configuration has an issue that an interval error between the guide layer and each recording layer causes a light condensation error of a light spot of the second light source on each recording layer.

In PTL 1, it is described that the light source position is controlled to correct the light condensation error; however, PTL 1 does not disclose a means for detecting the light condensation error caused by the interval error or a specific configuration to correct the light condensation error. In addition, to address the interval error that fluctuates during one turn of the optical disc, there is a need for a complex mechanism for moving the light source position in a wide band.

In PTL 2, control is performed to accurately condense the light spot of the second light source on the recording layer in such a manner that the light from the second light source reflected from the recording layer is received by the second photodetector and that the collimator lens on the optical path between the second light source and the optical disc is driven with the actuator on the basis of the signal of the light condensation error using the wobble marks. However, in this configuration, there is an issue that there is a need for a wideband actuator that drives the collimator lens and that the optical information processing device thus needs to be complex and large.

To address this issue, the present disclosure provides an optical information processing device in which, when information is optically writes and reads on an information recording medium having: a guide layer having a guide track; and a plurality of recording layers, an operation of focusing on the recording layer can be accurately performed with a simple configuration.

[1-2. Configuration]

FIG. 1 is a block diagram showing a configuration of optical information processing device 105 in a first exemplary embodiment.

Optical disc 101 described in FIG. 1 is an example of an information recording medium and is configured with: guide layer 103 having guide track 102; and a plurality of recording layers 104 (FIG. 1 shows five layers as an example). Optical information processing device 105 writes and reads information on optical disc 101.

Optical information processing device 105 has first light source 106 and second light source 107 that emit light having wavelengths different from each other.

Light emitted from first light source 106 passes through first prism 108 and is then converted into substantially collimated light by first collimate lens 109, which is an example of a magnitude changing element. First collimate lens 109 can be moved in an optical axis direction (the arrow direction in the diagram) to change magnification. The light having passed through first collimate lens 109 passes through combiner prism 110, wave plate 111, and objective lens 112, which is an example of a light condensing element, and is then condensed on guide layer 103 of optical disc 101.

Light reflected by guide layer 103 passes through objective lens 112, wave plate 111, combiner prism 110, and first collimate lens 109, is then reflected by first prism 108, and enters first photodetector 113.

First photodetector 113 is provided with a plurality of photoreception parts (not shown). First photodetector 113 detects a first focusing error signal and a tracking error signal by calculating signals output from the plurality of photoreception parts. The first focusing error signal represents a light condensation error of the light emitted from first light source 106 with respect to guide layer 103. The tracking error signal represents a tracking error of the light emitted from first light source 106 with respect to guide track 102. The first focusing error signal can be detected by using, for example, the generally used astigmatism method or the SSD method; however, other methods can be used. Similarly, the tracking error signal can be detected by using, for example, the generally used push-pull method or the APP method; however, other methods can be used.

The light emitted from second light source 107 passes through second prism 114 and is then converted into substantially collimated light by second collimate lens 115, which is an example of an aberration correction element. The second collimate lens 115 can be moved in an optical axis direction (the arrow direction in the diagram) to correct aberration. The light having passed through second collimate lens 115 is reflected by combiner prism 110, then passes through wave plate 111 and objective lens 112, which is an example of a light condensing element, and is then condensed on recording layer 104 of optical disc 101.

Light reflected by recording layer 104 passes through objective lens 112 and wave plate 111, is then reflected by combiner prism 110, passes through second collimate lens 115, is then reflected by second prism 114, and enters second photodetector 116.

Second photodetector 116 is provided with a plurality of photoreception parts (not shown). Second photodetector 116 detects a second focusing error signal by calculating output signals from the plurality of photoreception parts. The second focusing error signal represents a light condensation error of the light emitted from second light source 107 with respect to recording layer 104. The second focusing error signal can be detected by using, for example, the generally used astigmatism method or the SSD method; however, other methods can be used.

In this case, combiner prism 110 is designed to allow the wavelength of the light of first light source 106 to pass through and reflect the wavelength of the light of second light source 107 by substantially 90°. Therefore, the light emitted from first light source 106 and the light emitted from second light source 107 are both directed toward optical disc 101. Note that optical axes of the two beams of light entering combiner prism 110 are adjusted so that optical axes of the two beams of light directed toward optical disc 101 from combiner prism 110 substantially coincide with each other.

Figure 2:
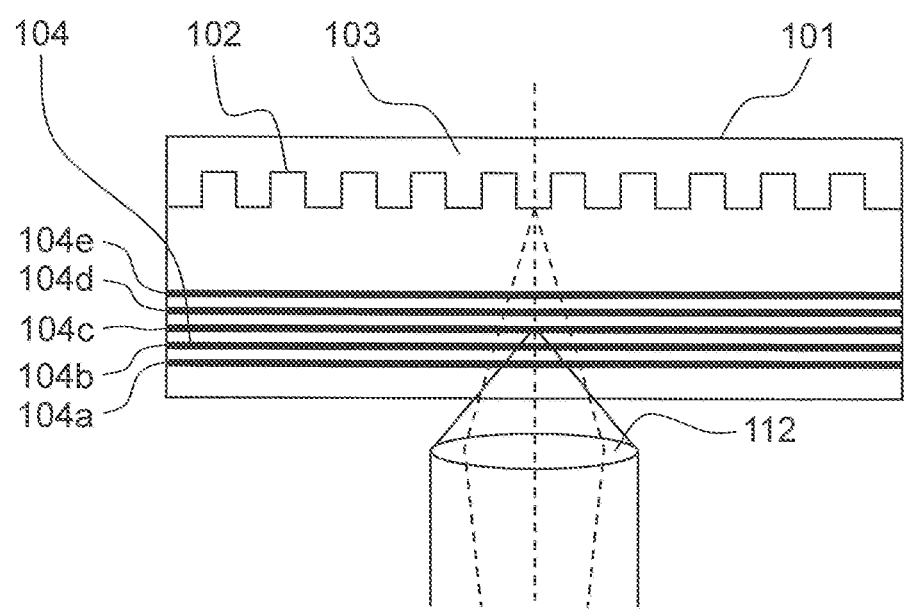
FIG. 2 is a diagram schematically showing how light is condensed in an optical disc.

FIG. 2 is a diagram schematically showing how light is condensed in optical disc 101. In FIG. 2, each of the five layers of recording layers 104 is assigned each of reference marks 104a to 104e.

The light emitted from first light source 106 is depicted by broken lines and is condensed on guide layer 103 by objective lens 112. The light emitted from second light source 107 is depicted by solid lines and is condensed on recording layer 104c by objective lens 112.

Since recording layers 104 are constituted by five layers, an interval between recording layers 104 and guide layer 103 depends on which of recording layers 104 is used for writing and reading. For example, in the case where writing and reading is performed on recording layer 104c, first collimate lens 109 and second collimate lens 115 are previously disposed at respective predetermined positions in such a manner that a spot interval, which is an interval between a condensed spot formed by first light source 106 and a condensed spot formed by second light source 107, is equal to an interval between recording layer 104c and guide layer 103. Since first collimate lens 109 and second collimate lens 115 are disposed at appropriate positions as described above, the light emitted from first light source 106 enters objective lens 112 in the state of diverging light, and the light emitted from second light source 107 enters objective lens 112 in the state of substantially collimated light, in the example of FIG. 2. This arrangement makes the spot interval between first light source 106 and second light source 107 equal to the interval between recording layer 104c and guide layer 103.

Also in the case where writing and reading is performed on recording layer 104 other than recording layer 104c, first collimate lens 109 and second collimate lens 115 are rearranged in appropriated positions to be corresponding to the interval between each recording layer 104 and guide layer 103. This arrangement makes it possible to make the spot interval between first light source 106 and second light source 107 equal to the interval between selected recording layer 104 and guide layer 103.

Figure 3:
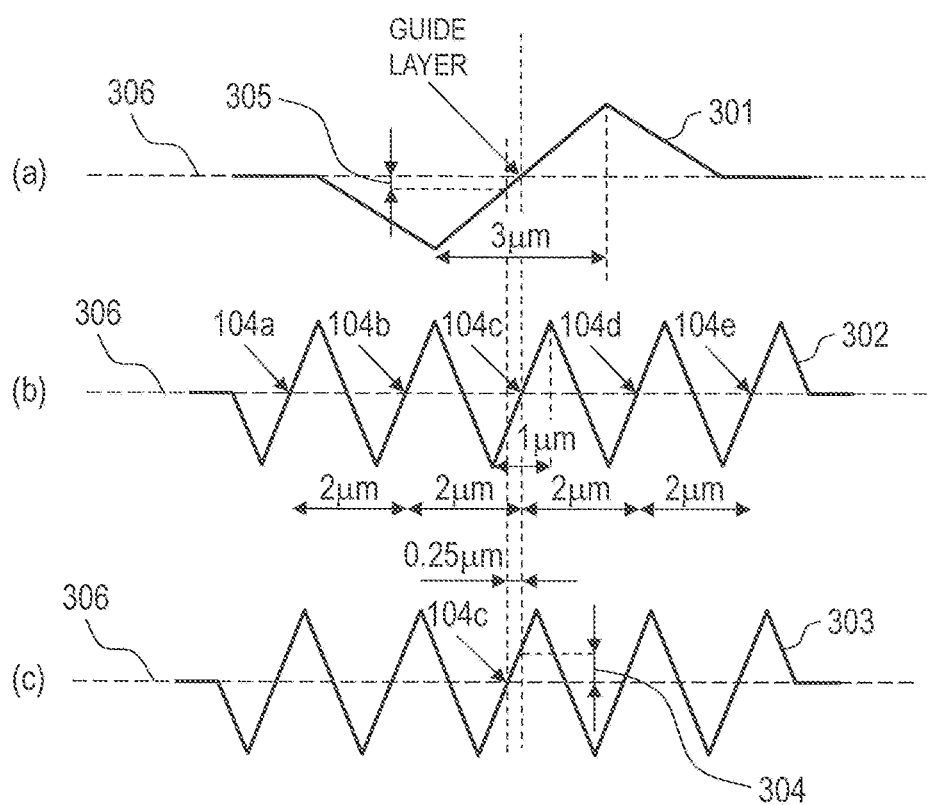
FIG. 3 is diagram for describing focusing error signals.

(a) of FIG. 3 shows a waveform of the first focusing error signal. The first focusing error signal can be obtained from the output signals of first photodetector 113 that receives the light of first light source 106 reflected by guide layer 103. In general, the focusing error signal has an S-shaped waveform but is depicted as a triangular waveform in the diagram for the sake of simplicity. Broken line 306 in (a) of FIG. 3 is a target level of the control in focusing control circuit 117 to be described later, and the control is performed to focus at the point denoted by "guide layer" in the diagram. That is, this point represents the state where the focus is on guide layer 103 (in focus), and this point is referred to as "focused point". In addition, a parameter corresponding to a peak-to-peak of the waveform of first focusing error signal 301 is referred to as focusing capture range and is set to 3 µm in this case.

(b) of FIG. 3 shows a second focusing error signal. The second focusing error signal can be obtained from the output signal of second photodetector 116 that receives the light of second light source 107 reflected by recording layer 104. In general, the reason for providing guide layer 103 in addition to recording layers 104 is to increase a layer density of each recording layer 104 and to thus increase a recording capacity. Therefore, layer intervals between recording layers 104 are necessarily set small.

(b) of FIG. 3 shows, as an example, the case where each layer interval between five recording layers 104 is 2 µm. In this case, to obtain the focusing error signal of each layer, the focusing capture range of second focusing error signal 302 is about 1 µm. Broken line 306 in (b) of FIG. 3 is a target level of the control in focusing control circuit 117, and each point depicted by each of "104a" to "104e" in the diagram represents the state where the focus is on each layer, that is, represents a focused point.

As described above, the components are arranged in such a manner that the spot interval between first light source 106 and second light source 107 is equal to the interval between recording layer 104c and guide layer 103. For this reason, the focused point on guide layer 103 in (a) of FIG. 3 and the focused point on recording layer 104c in (b) of FIG. 3 coincide with each other. Therefore, in the state shown in (a) and (b) of FIG. 3, when the light of first light source 106 is controlled to be focused on guide layer 103 by using first focusing error signal 301, the light of second light source 107 is automatically focused on recording layer 104c.

However, in the case of actual optical disc 101, due to variations in film thicknesses and the like created at the time of manufacturing, the interval between guide layer 103 and recording layer 104c has an error inside optical disc 101. That is, the interval between guide layer 103 and recording layer 104c fluctuates during one turn of optical disc 101.

(c) of FIG. 3 shows second focusing error signal 303 when the interval between guide layer 103 and recording layer 104c becomes large by 0.25 µm. When the light of first light source 106 is focused on guide layer 103, the light of second light source 107 is defocused from recording layer 104c by residual error 304. In this state, writing and reading performance with respect to recording layer 104c is impaired.

Alternatively, when the light of second light source 107 is controlled to be focused on recording layer 104c by using second focusing error signal 303, residual error 304 due to the film thickness variation and the like does not affect, but there is an issue to be described below. As described above, the focusing capture range of second focusing error signal 303 is about 1 µm, in other words, is only ±0.5 µm with respect to the focused point. This means that if defocus greater than 0.5 μm occurs due to disturbance such as vibration or contamination on optical disc 101 or the like, focusing control will fail, and stability of the focusing control is largely impaired.

On the other hand, regarding first focusing error signal 301, focusing capture is possible in the range of ±1.5 μm with respect to the focused point. Therefore, focusing control can be achieved more stably than in the case of using second focusing error signal 303. For this reason, in the present exemplary embodiment, first focusing error signal 301 is used to perform focusing control to focus the light of second light source 107 on recording layer 104*c*. A specific description will be made below.

The output signal of first photodetector 113 is input into focusing control circuit 117. First focusing error signal 301 obtained from the output signals of first photodetector 113 may be generated by a circuit (not shown) provided integrally with or provided close to first photodetector 113, or may be generated by focusing control circuit 117.

Focusing control circuit 117 performs focusing control so that first focusing error signal 301 is at a predetermined level, by driving objective lens 112 via actuator 118. At this time, focusing control circuit 117 controls objective lens 112 so that the light of second light source 107 is substantially focused on recording layer 104*c* as will be described below.

If there occurs an error in the interval between recording layer 104*c* and guide layer 103 as shown in (c) of FIG. 3 and the interval becomes unequal to the spot interval between first light source 106 and second light source 107, the light of second light source 107 is defocused from recording layer 104*c*. In (c) of FIG. 3, there is defocus of 0.25 μm, and residual error 304 occurs in second focusing error signal 303 at this time. To address this issue, focus offset 305 in first focusing error signal 301 in (a) of FIG. 3 is obtained from this residual error 304. Then, by displacing a focus position of focusing control circuit 117 from broken line 306 by focus offset 305, the light of second light source 107 can be made focused on recording layer 104*c*.

Figure 4:
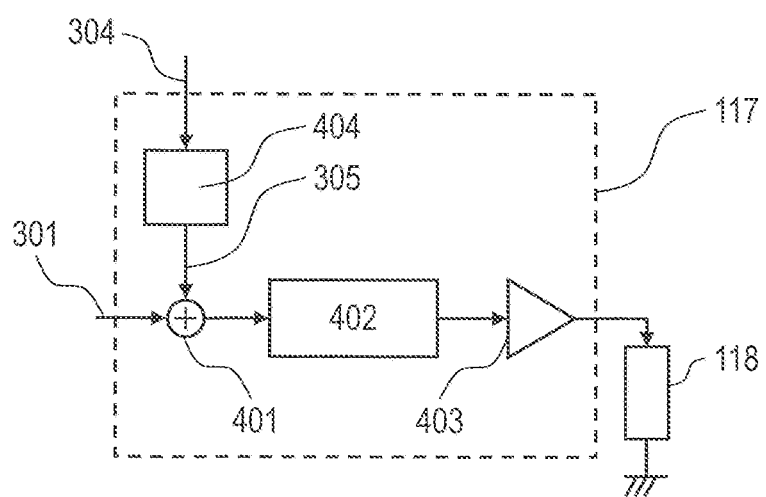
FIG. 4 is a block diagram showing a configuration of a focusing control circuit of the first exemplary embodiment.

FIG. 4 is a simple block diagram of focusing control circuit 117. An example of focusing control circuit 117 is configured with adding circuit 401, phase compensation circuit 402, drive circuit 403, and conversion circuit 404.

Upon receiving residual error 304 detected in second focusing error signal 303, conversion circuit 404 converts residual error 304 into focus offset 305. Adding circuit 401 adds first focusing error signal 301 and focus offset 305. The signal obtained by addition is input into phase compensation circuit 402, is phase-compensated by phase compensation circuit 402, and is then input into drive circuit 403. Drive circuit 403 drives actuator 118 by using the signal having been input.

That is, focusing control circuit 117 performs focusing control to focus at a point shifted by focus offset 305 with respect to first focusing error signal 301. This control enables the light of second light source 107 to be focused on recording layer 104*c*.

In FIG. 3, regarding first focusing error signal 301 and second focusing error signal 303, the amplitudes are the same, and the waveforms are simplified to be triangular waveforms. For this reason, the conversion by conversion circuit 404 from residual error 304 to focus offset 305 is represented by the following equation.

Focus offset 305=$k$×(residual error 304)/3

In this case, the value 3 of the denominator on the right side corresponds to the ratio of 3 μm to 1 μm, where 3 μm is the focusing capture range of first focusing error signal 301, and 1 μm is the focusing capture range of second focusing error signal 303. The value k is a conversion factor, and the larger the conversion factor k is, the closer to recording layer 104*c* the light condensed point of the light of second light source 107 can be located.

Figure 5:
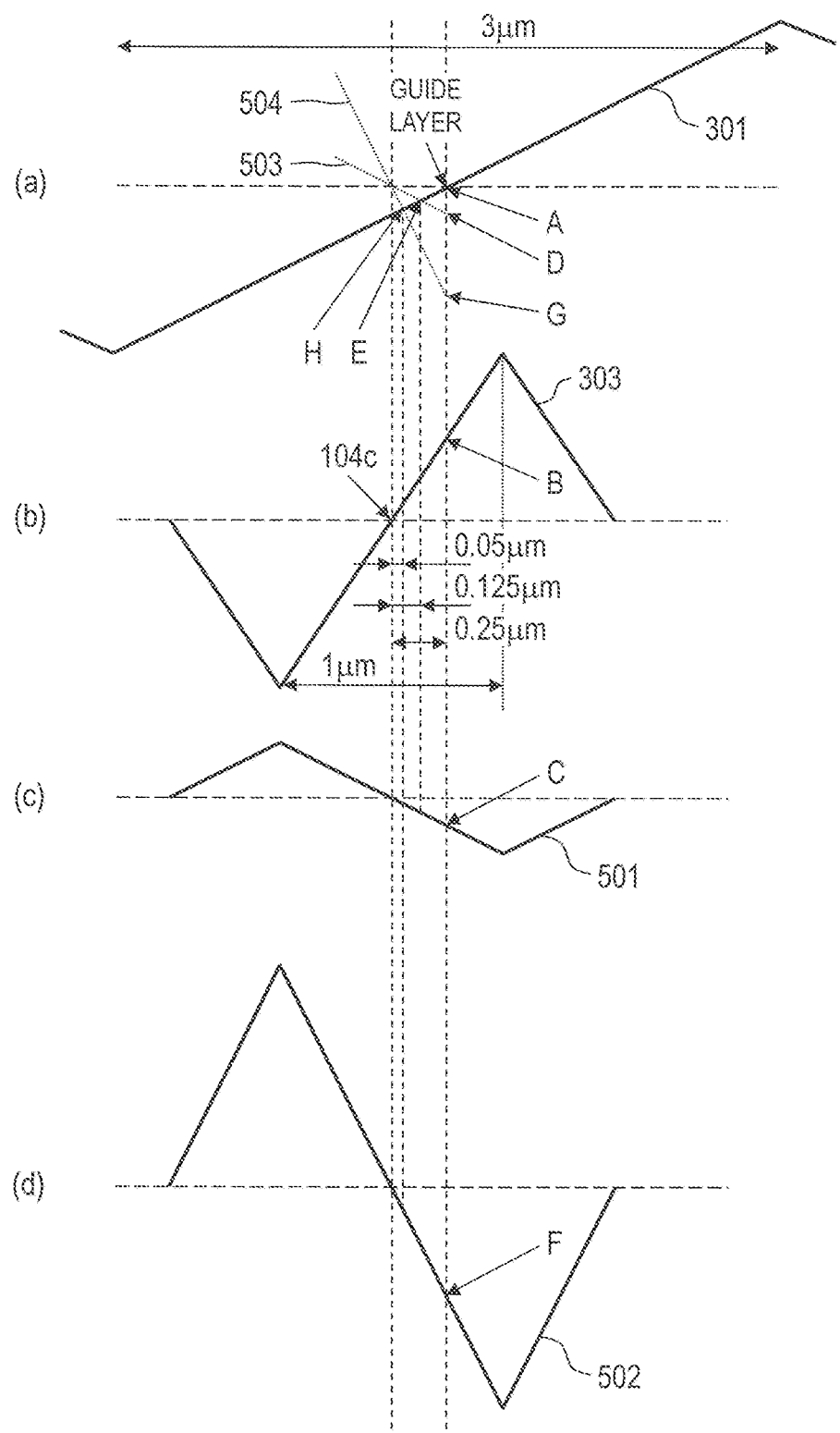
FIG. 5 is diagrams for describing focusing control of the first exemplary embodiment.

(a) of FIG. 5 is an enlarged view in the vicinity of the focused point of first focusing error signal 301 shown in (a) of FIG. 3. (b) of FIG. 5 is an enlarged view in the vicinity of the focused point of second focusing error signal 303 shown in (c) of FIG. 3. Similarly to (a) and (b) of FIG. 3, the focused point of each of first focusing error signal 301 and second focusing error signal 303 is deviated by 0.25 μm.

(c) of FIG. 5 shows focus offset 501 in the case of the conversion factor k=1. (d) of FIG. 5 shows focus offset 502 in the case of the conversion factor k=4. However, for the sake of the following description of operation, the sign is reversed in the diagrams. Specifically, k=−1 in (c) of FIG. 5, and k=−4 in (d) of FIG. 5.

Broken line 503 in (a) of FIG. 5 is a representation of a part of the waveform of focus offset 501 superposed on first focusing error signal 301. Similarly, broken line 504 is a representation of a part of the waveform of focus offset 502 superposed on first focusing error signal 301.

First, an operation of the focusing control in the case of k=1 will be described. In this case, first, supposing that the light spot of first light source 106 is at point A in (a) of FIG. 5. At this time, second focusing error signal 303 is deviated from the focused point (point on 104*c*) and is at point B in (b) of FIG. 5. Therefore, a value of point C in (c) of FIG. 5 is the focus offset. Point C corresponds to point D on broken line 503 in (a) of FIG. 5. The focus position of focusing control circuit 117 moves left on first focusing error signal 301 from point A. Corresponding to this movement, the focus offset also moves left on broken line 503 from point D. As a result, the focus position of focusing control circuit 117 is converged at point E, which is an intersection point between first focusing error signal 301 and broken line 503 in (a) of FIG. 5.

By this operation, in (b) of FIG. 5, the light condensed point of the light of second light source 107, which was defocused from recording layer 104*c* by 0.25 μm, is defocused by 0.125 μm, which is a remarkable improvement.

Next, an operation of the focusing control in the case of k=4 will be described. When the light spot of first light source 106 is at point A in (a) of FIG. 5, the value of point F in (d) of FIG. 5 is the focus offset. Point F corresponds to point G on broken line 504 in (a) of FIG. 5. The focus position of focusing control circuit 117 moves left on first focusing error signal 301 from point A. Corresponding to this movement, the focus offset also moves left on broken line 504 from point G. As a result, the focus position of focusing control circuit 117 is converged at point H, which is an intersection point between first focusing error signal 301 and broken line 504 in (a) of FIG. 5.

By this operation, the light condensed point of the light of second light source 107, which was defocused from recording layer 104*c* by 0.25 μm, is defocused by 0.05 μm, which is a remarkable improvement.

As described above, the larger the conversion factor k is, the closer to recording layer 104*c* the focus position of focusing control circuit 117 can be located. In view of the above, it is preferable to set k value at an appropriate value, depending on an acceptable value of the defocus for recording layer 104*c* and on stability of focusing control.

Because actual focusing error signal waveforms have different amplitudes from each other and are somewhat curved, the conversion equation in conversion circuit 404 is different from the above equation. However, since first focusing error signal 301 and second focusing error signal 303 are both known in the design stage, it is easy to convert residual error 304 to focus offset 305.

Note that, the block diagram in FIG. 4 illustrates that focusing control circuit 117 is configured with analog circuits; however, focusing control circuit 117 may be configured with digital circuits having the same functions, or a digital signal processor may be used.

The error in the interval between recording layer 104c and guide layer 103 is caused by a film thickness variation of optical disc 101 and the like, and fluctuates even during one turn. The defocus amount described in FIG. 3 to FIG. 5 is not constantly 0.25 μm but fluctuates. Depending on the fluctuation of the defocus amount, the value of focus offset 305 automatically changes. Therefore, it is possible to perform focusing control to focus the light of second light source 107 on recording layer 104c without any problem.

Further, in the focusing control of the present exemplary embodiment, when the interval between recording layer 104c and guide layer 103 has become unequal to the spot interval between first light source 106 and second light source 107, the light of second light source 107 is focused on recording layer 104c, but the light of first light source 106 is defocused from guide layer 103. In this case, regarding average defocus amounts during one turn of optical disc 101, the defocus amount of the light of first light source 106 with respect to guide layer 103 is larger than the defocus amount of the light of second light source 107 with respect to recording layer 104c. However, this defocus is well acceptable as described below.

Supposing that a wavelength of the light of first light source 106 is λ1 and a wavelength of the light of second light source 107 is λ2. Further, a numerical aperture of objective lens 112 for the light of first light source 106 is NA1, and a numerical aperture of objective lens 112 for the light of second light source 107 is NA2. Since an object of the present invention is to record on a plurality of recording layers in high density, it goes without saying that relationships λ1>λ2 and NA1<NA2 are satisfied.

Now, consideration is given to the case of λ1=660 nm, λ2=405 nm, NA1=0.6, and NA2=0.85. In this case, a focal depth Δz of the condensed spot of objective lens 112 is given by the following equation.

$$\Delta z = 0.5 \times \lambda / (NA)^2$$

Therefore, a focal depth Δz1 of the condensed spot of the light of first light source 106 is 0.92 μm, and a focal depth Δz2 of the condensed spot of the light of second light source 107 is 0.28 μm.

Consider a case where similarly to the example of FIG. 3, there occurs an error of 0.5 μm between the interval between recording layer 104c and guide layer 103 and the spot interval between first light source 106 and second light source 107, and thus there occurs defocus of 0.5 μm in the condensed spot. At this time, the focal depth Δz2 of the condensed spot of the light of second light source 107 condensed on recording layer 104c is 0.28 μm. Therefore, when defocus of 0.5 μm occurs, the writing and reading performance with respect to recording layer 104c is largely impaired. In contrast, the focal depth Δz1 of the condensed spot of the light of first light source 106 condensed on guide layer 103 is 0.92 μm. Therefore, even if defocus of 0.5 μm occurs, the defocus is within the focal depth, and the writing and reading performance with respect to guide layer 103 is barely affected by the defocus.

As described above, in the present exemplary embodiment, even if error occurs between the interval between recording layer 104c and guide layer 103 and the spot interval between first light source 106 and second light source 107, it is possible to condense the light of second light source 107 accurately on the recording layer 104 by using first focusing error signal 301.

In addition, it can be considered that the light of first light source 106 is largely defocused with respect to guide layer 103. For example, consider a case where there occurs an error greater than or equal to 1 μm between the interval between recording layer 104c and guide layer 103 and the spot interval between the first light source 106 and the second light source 107. Even in the case where the defocus occurring is greater than or equal to the focal depth of the condensed spot of the light of first light source 106, the configuration described below can avoid such a problem.

The information detected from guide layer 103 mainly includes, other than first focusing error signal 301, a tracking error signal and track address information detected from guide track 102.

A frequency of the tracking error signal detected by a push-pull method or other methods is generally much lower in frequency than a frequency with which an information signal is written and read on recording layer 104, and is generally less than or equal to 10 kHz. Therefore, a tolerance with respect to the condensed spot is large, and if defocus greater than or equal to the focal depth occurs, the amplitude of the tracking error signal becomes small, but the defocus barely affects tracking control.

The track address information is provided on guide track 102 in a form of track wobbles or pre-pits.

Track wobbles are made by making groove of guide track 102 meander (wobble) at a predetermined frequency, and track address information is superposed on a section length wobbling at the frequency. A principle of detecting a signal is the same as a push-pull method. A signal band is higher than that of the tracking error signal, corresponding to the frequency of wobbles but can be set lower than the frequency of the information signal to be written and read on recording layer 104. Therefore, if defocus greater than or equal to the focal depth occurs, the track address information can be well detected.

Alternatively, if the track address information is provided in a form of pre-pits, there is no problem in detecting the track address information as described below. The pre-pits provided in the guide track have much smaller amount of information than the information signal to be written and read on recording layer 104. In addition, since a recording form is pre-pits, an S/N ratio of the signal is very high, and even if defocus greater than or equal to the focal depth occurs, the track address information can be detected.

Further, a size of a condensed spot condensed by objective lens 112 is proportional to λ/NA. Suppose here that a length of the shortest mark of the track address information provided in guide track 102 is T1 and that the shortest mark length of the information signal recorded in recording layer 104 is T2.

When the relationship T1:T2=λ1/NA1:λ2/NA2 is satisfied, optical signal resolutions of both are substantially the same. By using the fact that the track address information has a smaller amount of information, setting can be done in such a manner that the following relationship is satisfied.

$$T1 > T2 \times (\lambda 1 \cdot NA2)/(\lambda 2 \cdot NA1)$$

By this setting, the optical signal resolution of the track address information is further improved. With this improvement and with the effect of the high S/N ration achieved by pre-pits, it is possible to more stably detect the track address information in the state of defocus.

Even in the case where there occurs an error in the interval between recording layer 104c and guide layer 103 and the spot interval between first light source 106 and second light source 107, if it is possible to drive at least one of first collimate lens 109 and second collimate lens 115 on the optical axis direction in a wide band by an actuator or the like, defocus does not occur in any of the spots of first light source 106 and second light source 107. However, such a configuration makes a configuration of optical information processing device 105 complex. In addition, there is a big issue that the device becomes large and the cost increases.

In contrast, in the present exemplary embodiment, it is not necessary to use an actuator for the collimate lens or other devices, and it is thus possible to stably achieve writing and reading on optical disc 101, with a simple configuration.

Note that in the present exemplary embodiment, the case where information is written and read on recording layer 104c is described as an example; however, it goes without saying that information is written and read on the other recording layers in a similar manner.

Further, in the present exemplary embodiment, a description about the tracking control has been skipped because the tracking control is not directly related to the point of the invention.

Here, the tracking control will be briefly described.

At the time of writing, the tracking error signal obtained by first photodetector 113 is used to drive objective lens 112 in the tracking direction (the horizontal direction in FIG. 3) by actuator 118. By this driving, the condensed spot of the light of first light source 106 is made to follow guide track 102. At this time, the condensed spot of the light of second light source 107 on recording layer 104 also moves in the tracking direction together with the condensed spot of the light of first light source 106. Then, the information signal is recorded in recording layer 104 while drawing the same trajectory as guide track 102. At the time of reading, guide track 102 may be used to perform the tracking control in a similar manner to the time of writing, or the tracking error signal may be generated from a recording mark array recorded in recording layer 104 by using a differential phase detection method.

[1-3. Advantageous Effects and the Like]

As described above, an optical information processing device in the present exemplary embodiment writes and reads information on an information recording medium having: a guide layer having a guide track; and a plurality of recording layers. The optical information processing device is configured with: a first light source; a second light source; a light condensing element that condenses light from the first light source and light from the second light source on the information recording medium; a first photodetector that receives the light from the first light source reflected by the information recording medium and generates a first focusing error signal; a second photodetector that receives the light from the second light source reflected by the information recording medium and generates a second focusing error signal; and a focusing control circuit that controls the light condensing element by using the first focusing error signal in such a manner that the light from the second light source is condensed on the recording layer of the information recording medium. The optical information processing device adds a correction to the focusing control circuit by using the second focusing error signal.

This arrangement realizes an optical information processing device that can perform a focusing operation to accurately focus on a recording layer with a simple configuration.

Second Exemplary Embodiment

Next, a second exemplary embodiment will be described with reference to FIG. 6 and FIG. 7.

[2-1. Configuration]

Figure 6:
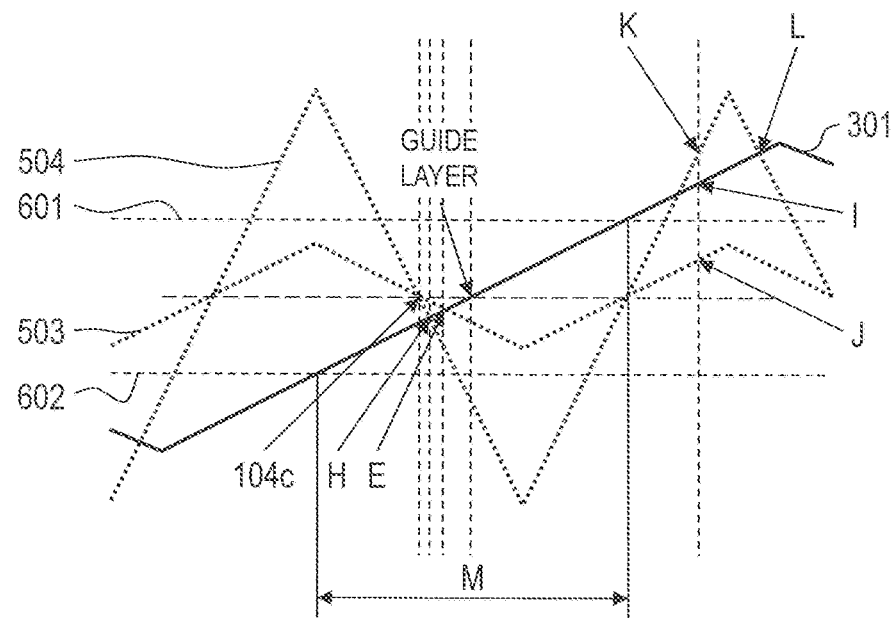
FIG. 6 is a diagram for describing focusing control of a second exemplary embodiment.

FIG. 5 focuses on the vicinity of the focused point of first focusing error signal 301, but FIG. 6 focuses on the whole of the focusing capture range of first focusing error signal 301.

Broken line 503 of FIG. 6 represents the focus offset in the case of the conversion factor k=1, and broken line 504 represents the focus offset in the case of the conversion factor k=5.

Consider here that the focus position is at point I on first focusing error signal 301.

First, in the case of the conversion factor k=1, a control target level of focusing control circuit 117 is point J on broken line 503. Then, the focus position at point I on first focusing error signal 301 moves left aiming at point J on first focusing error signal 301. Along with this movement, the target level also moves left on broken line 503 from point J. Finally, the focus position converges at point E, where first focusing error signal 301 and broken line 503 intersect with each other.

In contrast, in the case of conversion factor k of focus offset=5, the control target level of focusing control circuit 117 is point K on broken line 504. Because the level at point K is greater than the level at point I, the focus position moves right on first focusing error signal 301, aiming at the level at point K. Along with this movement, the target level also moves right on broken line 504 from point K. Then, the focus position converges at point L, where first focusing error signal 301 and broken line 504 intersect with each other. This shows that the focus position that should converge at point H under normal conditions erroneously converges at point L, and this is a big issue.

The present exemplary embodiment realizes an optical information processing device in which the focus position stably converges at point H even when the conversion factor k is large.

Figure 7:
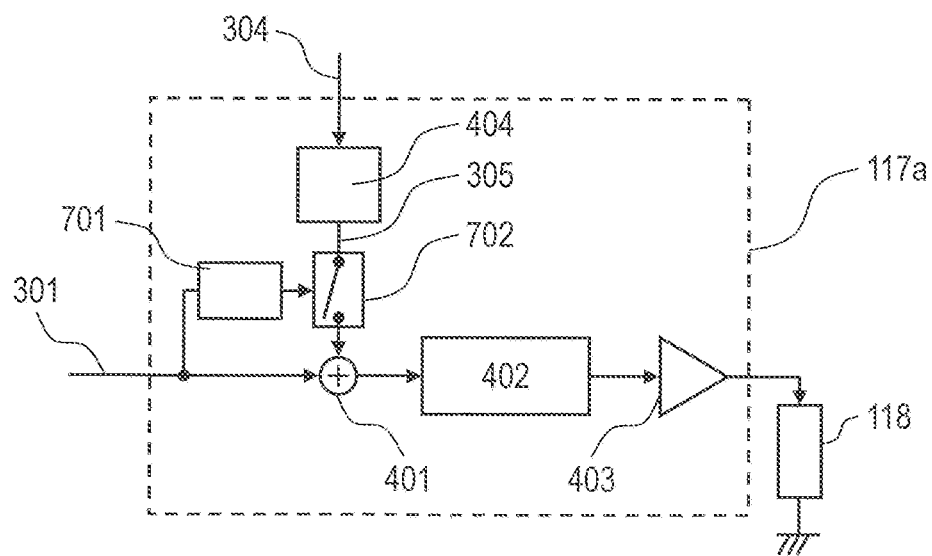
FIG. 7 is a block diagram showing a configuration of a focusing control circuit of the second exemplary embodiment.

FIG. 7 is a diagram showing a configuration of focusing control circuit 117a of the present exemplary embodiment. The components similar to those in FIG. 4 are assigned the same reference marks, and similar operations are not described.

In FIG. 7, focusing control circuit 117 of the first exemplary embodiment is additionally provided with amplitude detection circuit 701 and switch 702. First focusing error signal 301 is input into amplitude detection circuit 701. Amplitude detection circuit 701 compares an amplitude of first focusing error signal 301 with a previously held predetermined value. Then, if the amplitude of first focusing error signal 301 is smaller than or equal to a predetermined amplitude, amplitude detection circuit 701 operates to turn on switch 702. Switch 702 is provided between adding circuit 401 and conversion circuit 404. This arrangement can switch between adding and not adding focus offset 305 to first focusing error signal 301.

Broken line 601 and broken line 602 of FIG. 6 are each an example of the amplitude level detected by amplitude detection circuit 701. Broken line 601 is set to ½ of a peak level of first focusing error signal 301, and broken line 602 is set to ½ of a bottom level of first focusing error signal 301.

Amplitude detection circuit 701 turns on switch 702 only when the amplitude of first focusing error signal 301 is in section M between broken line 601 and broken line 602. That is, when the amplitude is in section M, focus offset 305 is added to first focusing error signal 301, and when the amplitude is not in section M, focus offset 305 is not added to first focusing error signal 301.

With this arrangement, in the case where the focus position is at point I on first focusing error signal 301, since point I is out of section M, the focus offset is not added, and the focus position moves left on first focusing error signal 301. When the focus position has reached inside section M, switch 702 is turned on, and focus offset 305 is added to first focusing error signal 301.

In the case of the conversion factor k=5, when the focus position is in section M, the focusing control is performed aiming at the level of broken line 504. Therefore, first focusing error signal 301 moves left, and the focus position converges at point H.

As described above, in the present exemplary embodiment, even if an initial focus position is largely deviated from a goal point of the focusing control, or even if the conversion factor k has a large value, the focusing control can be achieved stably.

Not that, the amplitude level to be detected by amplitude detection circuit 701 is not limited to broken line 601 or broken line 602. For example, it goes without saying that the amplitude level is set depending on the amplitude of first focusing error signal 301, the waveform of first focusing error signal 301, the defocus amount between guide layer 103 and recording layer 104, the conversion factor k, and the like.

[2-2. Advantageous Effects and the Like]

As described above, in the optical information processing device of the present exemplary embodiment, when the amplitude of the first focusing error signal is smaller than or equal to a predetermined amplitude, a correction is added to the focusing control circuit by using the second focusing error signal. The correction added to the focusing control circuit is specifically to add an offset to the first focusing error signal in the focusing control performed by the focusing control circuit, where the offset is generated based on the second focusing error signal.

This arrangement realizes an optical information processing device in which focusing operation for accurately focusing on the recording layer is possible with a simple configuration regardless of an initial focus position and a value of the conversion factor k.

Third Exemplary Embodiment

Next, a third exemplary embodiment will be described with reference to FIG. 8 to FIG. 9.

[3-1. Configuration]

Figure 8:
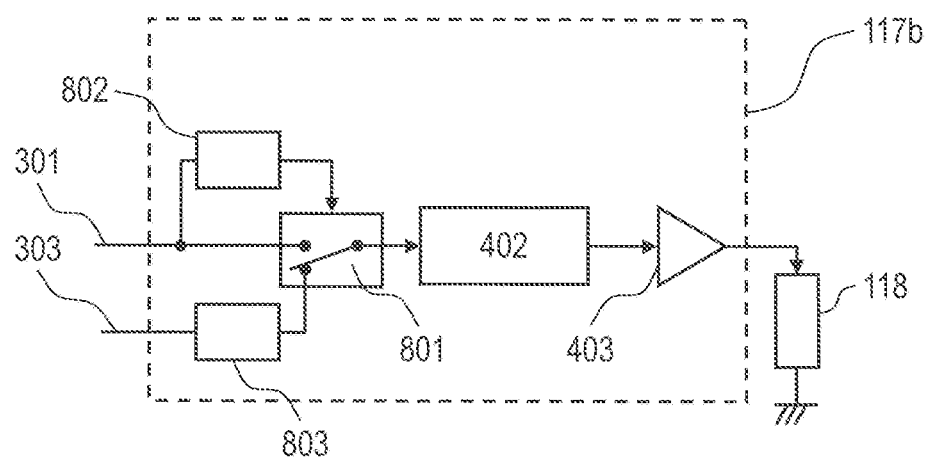
FIG. 8 is a block diagram showing a configuration of a focusing control circuit of a third exemplary embodiment.

FIG. 8 is a diagram showing a configuration of focusing control circuit 117*b* of the present exemplary embodiment. The components similar to those in FIG. 4 are assigned the same reference marks, and similar operations are not described. In FIG. 8, focusing control circuit 117 of the first exemplary embodiment is additionally provided with switch 801, amplitude detection circuit 802, and gain circuit 803.

In the present exemplary embodiment, the focusing error signal that is input into phase compensation circuit 402 can be switched with switch 801 between first focusing error signal 301 and second focusing error signal 303. First focusing error signal 301 is input into amplitude detection circuit 802. When the amplitude of first focusing error signal 301 is smaller than or equal to a predetermined amplitude, switch 801 is switched to make second focusing error signal 303 be input into phase compensation circuit 402. Second focusing error signal 303 is adjusted to a predetermined amplitude by gain circuit 803 and is then input into phase compensation circuit 402. When the amplitude of first focusing error signal 301 is greater than the predetermined amplitude, first focusing error signal 301 is input into phase compensation circuit 402.

Figure 9:
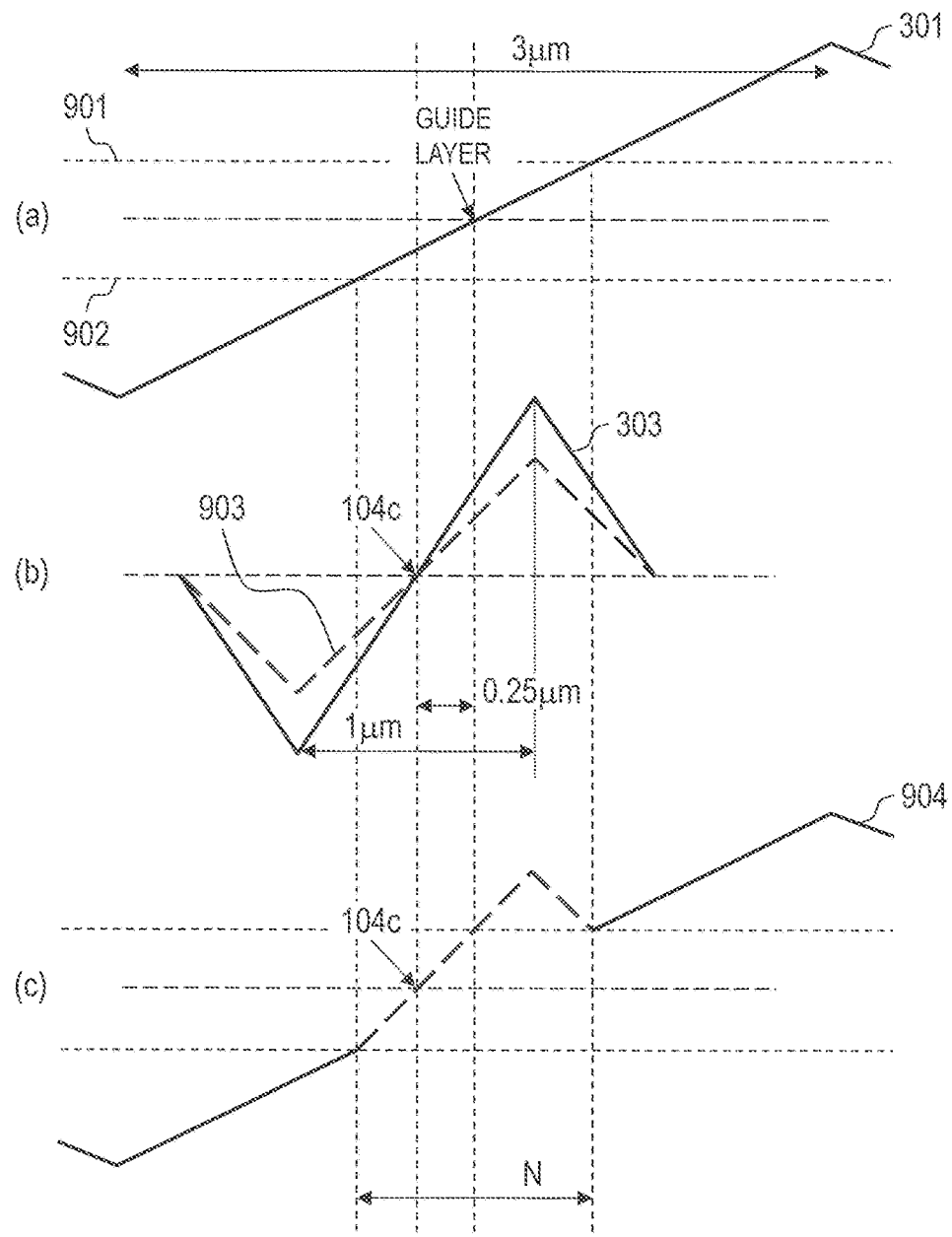
FIG. 9 is diagram for describing focusing control of the third exemplary embodiment.

(a) of FIG. 9 shows first focusing error signal 301. Broken line 901 and broken line 902 in (a) of FIG. 9 each show an example of the amplitude level detected by amplitude detection circuit 802. The solid line in (b) of FIG. 9 represents second focusing error signal 303, and the broken line shows second focusing error signal 903 having been adjusted to the predetermined amplitude by gain circuit 803. (c) of FIG. 9 shows focusing error signal 904 that is input into phase compensation circuit 402.

Reference mark N in (c) of FIG. 9 is a section in which the amplitude of first focusing error signal 301 is between broken line 901 and broken line 902. Outside section N, focusing error signal 904 is first focusing error signal 301, and inside section N, focusing error signal 904 is switched to second focusing error signal 903 having been adjusted to the predetermined amplitude by gain circuit 803.

If the focusing control is performed by using focusing error signal 904, the focus position is converged at recording layer 104*c*. By this operation, even if error occurs between the interval between recording layer 104*c* and guide layer 103 and the spot interval between first light source 106 and second light source 107, it is possible to condense the light of second light source 107 accurately on recording layer 104*c*.

Note that, in FIG. 9, as a result of appropriate gain adjustment by gain circuit 803, first focusing error signal 301 and second focusing error signal 903 having been adjusted to the predetermined amplitude are continuously composed. However, the composition does not have to be continuous.

(a) to (c) of FIG. 9 show a state where guide layer 103 and recording layer 104*c* are 0.25 μm defocused from each other; however, the amount of defocus due to a thickness error in optical disc 101 or other causes is not constant but varies continuously. In the case where the defocus amount continuously changes as described above, it is difficult to continuously compose first focusing error signal 301 and second focusing error signal 903 having been adjusted to a predetermined amplitude. Even if a discontinuous part is generated in focusing error signal 904, it does not cause any problem to controlling for focusing on recording layer 104*c*. However, if the difference in amplitude at the discontinuous part is extremely large, the focusing control can become unstable in some cases. To address this issue, it is preferable to set a gain of gain circuit 803 appropriately so that the amplitude difference at the discontinuous part is averagely small.

[3-2. Advantageous Effects and the Like]

As described above, in the optical information processing device of the present exemplary embodiment, when the amplitude of the first focusing error signal is smaller than or equal to a predetermined amplitude, switching is made from the first focusing error signal to the second focusing error signal, and the second focusing error signal is input into the focusing control circuit.

This arrangement realizes an optical information processing device that can perform a focusing operation to accurately focus on a recording layer with a simple configuration.

Other Exemplary Embodiments

The first to third exemplary embodiments have been described above as examples of the techniques disclosed in the present disclosure. However, the techniques in the present disclosure are not limited to the above exemplary embodiments, and can also be applied to embodiments in which change, substitution, addition, omission, and the like are performed. Further, it is possible to form a new exemplary embodiment by combining the components described in the first to third exemplary embodiments.

Therefore, other exemplary embodiments will be described below as examples.

(1) Consider that a numerical aperture of objective lens 112 for the light of first light source 106 is NA1 and a numerical aperture of objective lens 112 for the light of second light source 107 is NA2. As described above, since NA2>NA1, a light flux diameter of first light source 106 needs to be smaller than an aperture of objective lens 112. For example, first collimate lens 109 can be used to limit the aperture. However, when objective lens 112 has moved in the tracking direction, a center of objective lens 112 and a center of the aperture by first collimate lens 109 are displaced from each other, and quality of the condensed spot of the light of first light source 106 is thus lowered. To address this issue, the following configuration is preferably added.

Figure 10:
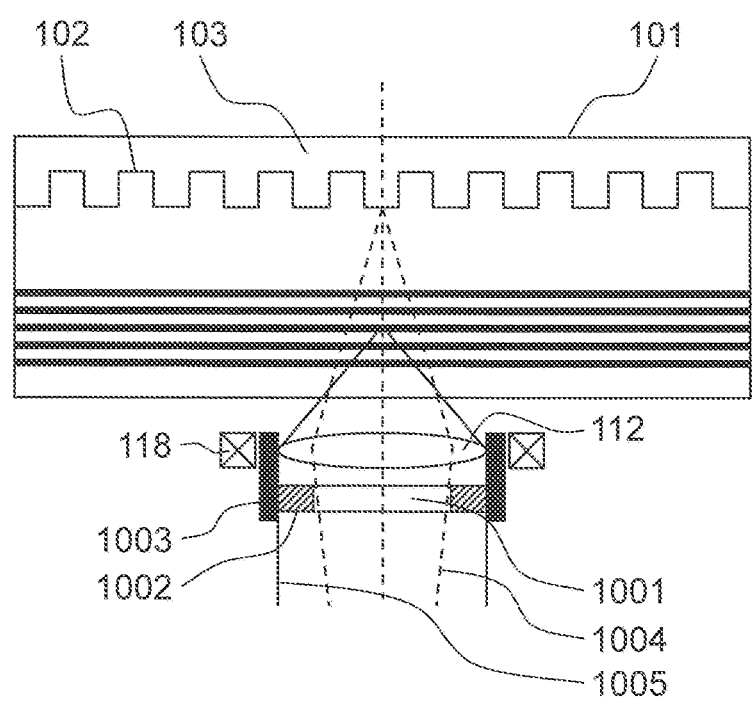
FIG. 10 is a diagram for describing an aperture limiting element.

FIG. 10 is a diagram showing a part of an optical information processing device including an aperture limiting element of the present exemplary embodiment. Aperture limiting element 1001 is provided on movable part 1003 integrally with objective lens 112. Aperture limiting element 1001 can be moved in the focusing direction and the tracking direction by actuator 118. The hatched area in a peripheral area of aperture limiting element 1001 is aperture limiting part 1002. Aperture limiting part 1002 has a function to allow light 1005, which is the light of second light source 107, to pass through but to block light 1004, which is the light of first light source 106. Such aperture limiting part 1002 can be easily realized by a multi-layer film or the like.

The present configuration maintains the quality of the condensed spot of the light of first light source 106 even when objective lens 112 moves in the tracking direction. In addition, the present configuration further has an effect that it is possible to increase the focal depth of the condensed spot of the light of first light source 106 with respect to guide layer 103.

(2) Note that aperture limiting part 1002 can be configured with a diffraction grating instead of a multi-layer film. In this case, the diffraction grating is provided in a surface of the peripheral area of aperture limiting element 1001 by etching or molding. The diffraction grating has an advantage of being realized at a lower cost than the multi-layer film. Further, the diffraction grating can be provided also on a surface of objective lens 112. In this case, there is an advantage that, since the diffraction grating can be provided simultaneously at the time of molding objective lens 112, cost can be further reduced, and the number of components can be decreased.

INDUSTRIAL APPLICABILITY

An optical information processing device in the present disclosure can perform a stable focusing operation with a simple configuration when information is written and read on an information recording medium having; a guide layer having a guide track; and a plurality of recording layers. For this reason, the optical information processing device in the present disclosure is applicable to a writing and reading device such as an optical disc device or an optical tape device that optically writes and reads information on an information recording medium.

What is claimed is:

1. An optical information processing device that writes and reads information on an information recording medium having: a guide layer having a guide track; and a plurality of recording layers, the optical information processing device comprising:
    a first light source;
    a second light source;
    a light condensing element that condenses light from the first light source and light from the second light source on the information recording medium;
    a first photodetector that receives light reflected by the information recording medium after being emitted from the first light source and generates a first focusing error signal;
    a second photodetector that receives light reflected by the information recording medium after being emitted from the second light source and generates a second focusing error signal; and
    a focusing control circuit that controls the light condensing element by using the first focusing error signal in such a manner that the light from the second light source is condensed on each of the plurality of recording layers in the information recording medium,
    wherein the second focusing error signal is used to add a correction to the focusing control circuit.

2. The optical information processing device according to claim 1, wherein the light from the first light source is substantially condensed on the guide layer.

3. The optical information processing device according to claim 1, wherein an average defocus amount of the light from the first light source condensed on the guide layer is greater than an average defocus amount of the light from the second light source condensed on each of the plurality of recording layers.

4. The optical information processing device according to claim 1, wherein the correction added to the focusing control circuit is to add an offset to the first focusing error signal in focusing control performed by the focusing control circuit, and
    the offset is generated based on the second focusing error signal.

5. The optical information processing device according to claim 1, wherein a focusing capture range of the first focusing error signal is greater than a focusing capture range of the second focusing error signal.

6. The optical information processing device according to claim 1, wherein a following relationship is satisfied:

$$T1 > T2 \times (\lambda 1 \cdot NA2)/(\lambda 2 \cdot NA1),$$

where $\lambda 1$ is a wavelength of the light from the first light source,
    NA1 is a numerical aperture of the light condensing element for the light from the first light source,
    $\lambda 2$ is a wavelength of the light from the second light source,
    NA2 is a numerical aperture of the light condensing element for the light from the second light source,
    T1 is a length of a shortest mark recorded in the guide layer, and
    T2 is a length of a shortest mark recorded in the plurality of recording layers.

7. The optical information processing device according to claim 1, wherein, when an amplitude of the first focusing error signal is smaller than or equal to a predetermined amplitude, the second focusing error signal is used to add a correction to the focusing control circuit.

8. The optical information processing device according to claim 7, wherein the correction added to the focusing control circuit is to add an offset to the first focusing error signal in focusing control performed by the focusing control circuit, and the offset is generated based on the second focusing error signal.

9. The optical information processing device according to claim 7, wherein the correction added to the focusing control circuit is to switch between the second focusing error signal and the first focusing error signal and to input the second focusing error signal or the first focusing error signal to which the switching has been performed into the focusing control circuit.

10. The optical information processing device according to claim 9, wherein, when the second focusing error signal is input into the focusing control circuit, the second focusing error signal is input into the focusing control circuit after an amplitude of the second focusing error signal is adjusted.

11. The optical information processing device according to claim 1, comprising an aperture limiting element provided integrally with the light condensing element, wherein the aperture limiting element limits an aperture for only the light from the first light source.

12. The optical information processing device according to claim 11, wherein the aperture limiting element is configured with a diffraction grating.

13. The optical information processing device according to claim 12, wherein the diffraction grating is provided on the light condensing element.

14. The optical information processing device according to claim 1, comprising:

a magnitude changing element provided on an optical path between the first light source and the information recording medium; and an aberration correction element provided on an optical path between the second light source and the information recording medium.

* * * * *